(12) United States Patent
Rongved

(10) Patent No.: US 6,180,012 B1
(45) Date of Patent: Jan. 30, 2001

(54) SEA WATER DESALINATION USING $CO_2$ GAS FROM COMBUSTION EXHAUST

(76) Inventor: Paul I. Rongved, 5701 Blvd. East Apt. 12H, West NY, NJ (US) 07093

(*) Notice: Under 35 U.S.C. 154(b), the term of this patent shall be extended for 0 days.

(21) Appl. No.: 08/816,792

(22) Filed: Mar. 19, 1997

(51) Int. Cl.$^7$ .................................................. C02F 1/58
(52) U.S. Cl. ........................ 210/717; 210/718; 210/724; 210/726; 210/738; 423/429; 423/471
(58) Field of Search ..................... 210/702, 710, 210/712, 717, 718, 723, 724, 726, 738; 423/429, 470, 471

(56) References Cited

U.S. PATENT DOCUMENTS

| | | | |
|---|---|---|---|
| 1,491,672 | * 4/1924 | Claude ................................. | 423/471 |
| 1,570,299 | * 1/1926 | Galt ..................................... | 423/470 |
| 2,003,378 | * 6/1935 | MacMullin ........................... | 423/470 |
| 2,843,454 | * 7/1958 | Devaux et al. ..................... | 423/471 |
| 3,014,782 | * 12/1961 | Arita et al. ......................... | 423/471 |
| 3,203,894 | * 8/1965 | Ikuno .................................. | 210/726 |
| 3,332,767 | * 7/1967 | Heins .................................. | 423/470 |
| 5,683,587 | * 11/1997 | Ferrara et al. ..................... | 210/696 |

* cited by examiner

Primary Examiner—Peter A. Hruskoci

(57) ABSTRACT

The invention relates to desalination of Sea water and of brakish water, and removal of harmful $CO_2$ gas in exhaust from combustion apparatuses. The exhaust, rich in carbon dioxide ($CO_2$) is diverted to a process chamber, where Sea water, after being mixed with Ammonia, as a catalyst to weaken the salt molecules, is pumped into the chamber and dispersed at many points near the top, as a fine spray, exposing the salt to the $CO_2$ gas there. The internal bond of the salt molecules (NaCl) are weaker by the Ammonia in the water attaching and pulling on their Cl atom. The $CO_2$ in the chamber is attaching and pulling on the Na atom of the salt molecules and are further reduces the bond, breaking them apart. Two heavy solids are formed, they settle in a clarifier below and are removed. Desalinated Sea water, in large quantities per ton of salt, over flows from the clarifier, for use in communities and for agriculture. Therewith is also harmful $CO_2$ in the exhaust removed, before being discharged from the process chamber to the sky. The solid $NH_4Cl$ can be recycled for Ammonia, and the second solid $Na_2CO_3$ is a saleable product, which may more than pay for the process.

4 Claims, 2 Drawing Sheets

FIG I

SEA WATER DESALINATION USING $CO_2$ GAS FROM COMBUSTION EXHAUST

BACKGROUND OF THE INVENTION

Water for communities, agriculture and industry is more and more needed, and not available in many areas of the world. Sea water can not be used because it contains salt, and existing methods for removing salt are slow, difficult and costly, and require much energy.

Energy consumption is increasing world wide and most of it is produced by combustion of oil, gas, coal, wood and other organic material, which are polluting the environment. Environmental scientist from all over the world, are now recommending that carbon dioxide ($CO_2$) now being produced and discharged to the sky be reduced, to protect the environment from the bad greenhouse effect $CO_2$ gases have. Many nations have therefore now committed themselves to reduce their $CO_2$ emission, as a legal requirement.

The present invention is therefore of great importance indeed, providing a practical process, at low cost, for producing large quantities of desalted Sea water, using $CO_2$ for the process from combustion exhaust, which other wise would be contaminating the environment. No existing economical process provides simultaneously these results, although other processes are using similar chemicals. Particularly the ammonia-soda ash process, which Ernest Solvay improved in 1865, by saturating concentrated solution of sodium chloride with ammonia and passing carbon dioxide through it to obtain soda ash.

SUMMARY OF THE INVENTION

The above and other objects and advantages are obtained in accordance with the present invention comprising a chemical process for desalination of Sea water, and removal of $CO_2$ from exhaust. Salt molecules (NaCl) have a strong internal bond between the Na and the Cl atoms, which will be broken in two steps.

In the first step of the present invention a catalyst being Ammonia($NH_3$) will be carefully metered and mixed with the Sea water which has about 3% of salt to be removed. The Ammonia mixes readily with water and forms ($NH_4OH$), which contains very aggressive reactant molecules. They have strong attraction and are pulling on the Cl atom of the salt molecules in the Sea water. This reduces the internal bond, and makes the salt more vulnerable.

The second step of said process is performed in an enclosed process chamber, located above a clarifier. Combustion exhaust gas, rich in carbon dioxide ($CO_2$) and normally discharged to the sky, harming the environment, is being used for the process. The gas enters through inlet on one side and remains in the chamber for the process. The remaining gas leaves at outlet on the other side. The Sea water mixture is pumped into the process chamber to numerous outlets near the top and is dispersed as non-clogging mist.

The $CO_2$ gas molecules are attracted to the Na atom of the salt and further weaken and break the salt molecules apart in the mist of Sea water.

Two heavy solids are formed, they settle in the clarifier and are removed in under flow outlet.

The desalted Sea water over flows from the clarifier in large quantities per ton of salt, since salt is only present in about three percent in Sea water. The desalted sea water can then be used for communities, industry and agriculture. It still contains some dissolved ammonia and plankton and other microorganisms, which in the ocean are nutrients for other sea life. These nutrients can also be used to fertilize soil for farms. Alternatively, where needed they can be removed from the water by intense aeration and biological process or by non-clogging filters. The colloidal material flocculate and is recovered as sludge or filter cake.

The two solids from the breakup of the salt, and removal of the $CO_2$ gas, are:

Sodium carbonate ($Na_2CO_3$) with specific gravity 2.53, and

Ammonium chloride ($NH_4Cl$) with specific gravity 1.53.

The two solids can be separated by hydro cyclone separator, air conveyor and spray or other means.

There are growing markets and good prices for sodium carbonate. It may pay for the total process and more, rendering the desalted Sea water free of charge.

The Ammonium in the $NH_4Cl$ can be recycled by thermal treatment with calcium oxide, or converted to $NH_3$ and Cl.

The chemical formula for the salt break up with Sea water as carrier and 3 percent salt and 1 Ton salt being removed, is:

$$\begin{array}{ccccccc} 32.3T & 1.0T & 0.45T & 0.38T & 0.91T & 0.91T & 32.3T \\ 194\,H_2O + & 2NaCl + & 2NH_3 + & CO_2 = & NaCO_3 + & 2NH_4Cl + & 194\,H_2O \\ 18 & 116 & 52 & 44 & 106 & 106 & 18 \end{array}$$

BRIEF DESCRIPTION OF DRAWINGS

Certain preferred and illustrative embodiments of the invention are shown on the drawings.

On FIG. 1 is a vertical section I showing the process chamber with a clarifier below.

Figure 2:
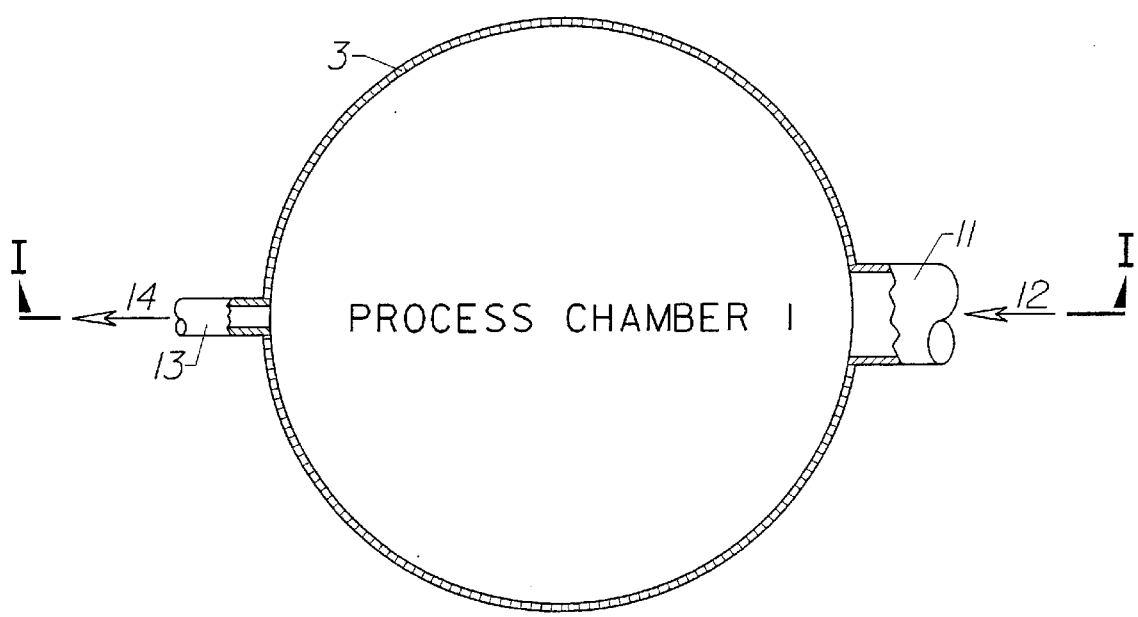

On FIG. 2 is a horizontal section II of the process chamber.

DETAILED DESCRIPTION OF PREFERRED EMBODIMENTS

Figure 1:
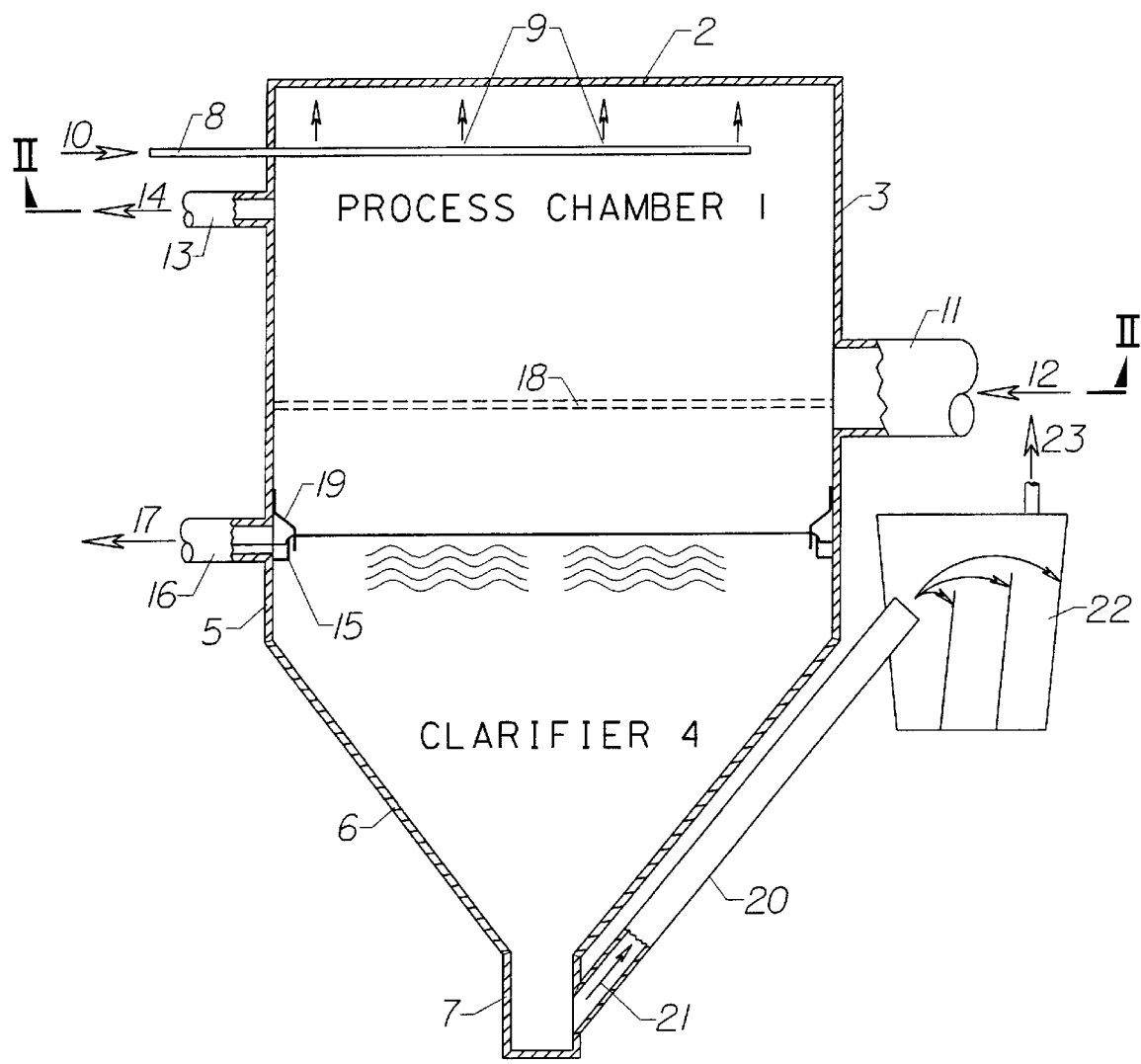

FIG. 1 and FIG. 2 comprise a process chamber 1, having a top plate 2 and a cylindrical wall 3, above a clarifier 4 with a cylindrical wall 5 connected to a conic bottom 6 with a sump pit 7. The entrance pipe 8 with numerous dispersing spray outlets 9 is supplying Sea water mixed with Ammonia 10. The entrance duct 11 is supplying combustion exhaust with $CO_2$ gas 12 to the process chamber. The exit duct 13 is removing remnant exhaust gas 14.

The over flow weir 15 and the over flow pipe 16 are discharging Sea water 17 with salt removed. The splash boards 18 and the ring over flow cover 19 are catching and splashing the water for additional salt removal. The pipe conveyor 20 is removing under flow from the pit by air injection 21, which mixes and lightens the material from the pit and sprays it out into the separator 22 to separate the materials with different specific gravity. The air 23 is removed at the top of the separator.

DESCRIPTION OF SPECIFIC EMBODIMENTS

An improved processing method or plant, in accordance with the present invention, with molecular breakdown and beneficial reduction of salt insitu in Sea water or other salt water, is achieved in a continuous chemical process performed in one or more enclosed process chambers, each located above a clarifier, and arranged in tandem or parallel.

Combustion exhaust rich in $CO_2$ gas, normally discharged from gas, oil and coal power plant, furnaces and other combustion apparatuses and harmful to the environment when reaching the upper sky, is being diverted to the process chambers and the $CO_2$ gas used for the process as it is being removed from the exhaust.

The Sea water has Ammonia as a catalyst added and mixed in, in balanced quantities with the salt, to weaken the inner bond of the salt, before the Sea water is pumped into the process chamber and dispersed as a fine spray at numerous points near the top. The $CO_2$ gas acts there as a strong reactant to the weakened salt molecules and tear them apart. Two heavy solids form with atoms from the salt, ammonia, $CO_2$ and water. These solids settle in the clarifier below and are removed as under-flow and then separated. The Sea water hits splash boards at one or more elevations to further expose the salt molecules to the $CO_2$ as required, before the Sea water with salt removed is discharged as over-flow from the clarifier.

The number of process chambers can be used in different ways, if two, three or more process chambers are arranged parallel, there is a proportional reduction per square meter of the chamber area, in flow of Sea water, salt, Ammonia and $CO_2$, and increased desalination of the Sea water. As an other example, if there are three similar process chambers arranged in tandem, and the combustion exhaust flows from one to the second to the third and remnnant exhaust is then discharged there, the Sea water mixed with Ammonia may be pumped into the second chamber and is processed there. But if the processed Sea water still has too much salt, it may be checked for sufficient Ammonia and pumped to the first process chamber for a polishing process to meet the desalination requirements. A small portion of mixed Sea water pumped, can be diverted and sprayed into the third process chamber for a polishing process to remove remaining $CO_2$ gas when required. The process of the invention is mainly for Sea water that has a relative uniform salt content. Sea water has about three weight percent salt, but the percentage will vary accordance to location. In Fjords and narrow bays, that are receiving large volumes of fresh water the percentage of salt will be less. In tropical zones and shallow water the salt content is higher, but generally does not exceed 4% by weight. Magnesium, calcium and potassium exist in very small proportion in Sea water as salt. These metals are needed in most living cells, and a part may be removed in the described process. There are also protons and other micro creatures in the sea water, which in the ocean act as nutrients for other sea life.

These can also act as fertilizer when desalinated Sea water is used for agriculture in arid or semiarid locale where increasing population and draught make desalinated Sea water an extremely valuable resource as in California or Hong Kong. In the Arabic States much gas from oil wells is flared, but can be used as fuel for electric power. The exhaust from these can be diverted and the harmful $CO_2$ gas can be removed and used in the invented process for desalination of Sea water in large quantities, which then can be available to make the desert productive for agriculture. Ammonia is now produced in large guantities at low cost, so recycling may not be needed or cost effective.

It shall be understood that salt water other than Sea water can be used as an alternate in this invention, and a maximum concentration of 22 percent of salt is being used, to avoid clogging and provide a more reliable process.

This invention has been disclosed with respect to certain preferred Embodiments, and it will be understood that various modifications and variations thereof, obvious to those skilled in the art, to be included within the scope of the appended claims.

What is claimed is:

1. A process for desalination of Sea or brackish water, comprising mixing ammonia ($NH_3$) into said water to form an effective amount of ammonium hydroxide ($NH_4OH$) to react with NaCl salt molecules present in said water and weaken the NaCl bonds in said molecules; spraying said water as a fine spray near the top of an enclosed process chamber; exposing the sprayed water to an effective amount of $CO_2$ combustion exhaust gas to react with said salt molecules and form sodium carbonate ($Na_2CO_3$) and ammonium chloride ($NH_4Cl$) solids; settling said solids in a clarifier below said process chamber; removing said solids through an underflow outlet in said clarifier; discharging exhaust gas from said process chamber; and removing desalinated water as an overflow from said clarifier.

2. A process as in claim 1, wherein said process chamber is provided with splash boards to catch and splash the water for addition salt removal.

3. A process as in claim 1, wherein said water has a maximum salt concentration of 22 percent.

4. A process as in claim 1, wherein said process is performed in two or more chambers arranged in tandem or parallel.

* * * * *